US009965057B2

(12) United States Patent
Gur et al.

(10) Patent No.: US 9,965,057 B2
(45) Date of Patent: *May 8, 2018

(54) UNIVERSAL STYLUS COMMUNICATION WITH A DIGITIZER

(71) Applicant: Microsoft Technology Licensing, LLC, Redmond, WA (US)

(72) Inventors: Arie Gur, Kiryat-Ono (IL); Amir Zyskind, Natania (IL); Ilan Geller, Pardesia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/657,236

(22) Filed: Jul. 24, 2017

(65) Prior Publication Data

US 2017/0322646 A1    Nov. 9, 2017

Related U.S. Application Data

(63) Continuation of application No. 14/986,764, filed on Jan. 4, 2016, now Pat. No. 9,746,944.

(60) Provisional application No. 62/099,526, filed on Jan. 4, 2015.

(51) Int. Cl.
    *G06F 3/0354*   (2013.01)
    *G06F 3/038*    (2013.01)
    *G06F 3/044*    (2006.01)
    *G06F 3/046*    (2006.01)
    *G06F 3/041*    (2006.01)

(52) U.S. Cl.
    CPC ........ *G06F 3/03545* (2013.01); *G06F 3/0383* (2013.01); *G06F 3/044* (2013.01); *G06F 3/046* (2013.01); *G06F 3/0414* (2013.01); *G06F 3/0418* (2013.01)

(58) Field of Classification Search
    None
    See application file for complete search history.

(56) References Cited

U.S. PATENT DOCUMENTS

| 1,303,061 | A  | 5/1919  | Herwig, Jr.    |
| 5,571,997 | A  | 11/1996 | Gray et al.    |
| 7,292,229 | B2 | 11/2007 | Morag et al.   |
| 7,646,379 | B1 | 1/2010  | Drennan et al. |
| 8,022,317 | B2 | 9/2011  | Ely            |

(Continued)

FOREIGN PATENT DOCUMENTS

| EP | 1303061        | 4/2003 |
| WO | WO 2015/036999 | 3/2015 |
| WO | WO 2016/108214 | 7/2016 |

OTHER PUBLICATIONS

Communication Relating to the Results of the Partial International Search dated Mar. 30, 2016 From the International Searching Authority Re. Application No. PCT/IB2016/050013.

(Continued)

*Primary Examiner* — Nicholas Lee (57) ABSTRACT

A method includes generating a first signal type and a second signal type in a handheld device and transmitting both the first signal type and the second signal type in a transmission cycle of the handheld device. The first signal type and the second signal type are different in at least one of frequency or modulation and are defined to include a same information related to the handheld device.

20 Claims, 4 Drawing Sheets

(56) References Cited

U.S. PATENT DOCUMENTS

| | | |
|---|---|---|
| 8,411,053 B2 | 4/2013 | Doubrava et al. |
| 8,629,358 B2 | 1/2014 | Rimon et al. |
| 8,669,967 B2 | 3/2014 | Zachut |
| 8,730,177 B2 | 5/2014 | Westerman et al. |
| 9,035,920 B2 | 5/2015 | Stern |
| 9,081,448 B2 | 7/2015 | Geaghan |
| 9,182,835 B2 | 11/2015 | King-Smith et al. |
| 9,244,543 B1 | 1/2016 | Sundara-Rajan et al. |
| 9,542,014 B1 | 1/2017 | Sundara-Rajan et al. |
| 2003/0214490 A1 | 11/2003 | Cool |
| 2004/0150631 A1 | 8/2004 | Fleck et al. |
| 2004/0160429 A1 | 8/2004 | Blake et al. |
| 2009/0153526 A1 | 6/2009 | Blake et al. |
| 2010/0051356 A1 | 3/2010 | Stern et al. |
| 2010/0155153 A1 | 6/2010 | Zachut |
| 2011/0176467 A1 | 7/2011 | Lampe et al. |
| 2012/0127110 A1 | 5/2012 | Amm et al. |
| 2013/0088465 A1 | 4/2013 | Geller et al. |
| 2013/0106714 A1* | 5/2013 | Shahparnia ........... G06F 1/3203 345/173 |
| 2013/0106722 A1 | 5/2013 | Shahparnia et al. |
| 2013/0265265 A1 | 10/2013 | Stern |
| 2013/0328810 A1 | 12/2013 | Li et al. |
| 2014/0104188 A1 | 4/2014 | Bakken et al. |
| 2014/0111461 A1 | 4/2014 | Rimon et al. |
| 2014/0168116 A1 | 6/2014 | Sasselli et al. |
| 2014/0168142 A1 | 6/2014 | Sasselli et al. |
| 2014/0176495 A1 | 6/2014 | Vlasov |
| 2014/0184567 A1* | 7/2014 | Zachut ................ G06F 3/03545 345/174 |
| 2014/0210785 A1 | 7/2014 | King-Smith et al. |
| 2014/0253467 A1 | 9/2014 | Hicks et al. |
| 2014/0267078 A1 | 9/2014 | Kukulski et al. |
| 2014/0368455 A1 | 12/2014 | Croisonnier et al. |
| 2015/0036999 A1 | 2/2015 | Batur et al. |
| 2015/0145820 A1 | 5/2015 | Huang et al. |
| 2015/0170383 A1 | 6/2015 | Motoi |
| 2015/0212597 A1 | 7/2015 | Westhues |
| 2015/0346847 A1 | 12/2015 | Zachut |
| 2015/0346890 A1 | 12/2015 | Zachut |
| 2015/0363012 A1 | 12/2015 | Sundara-Rajan et al. |
| 2016/0108214 A1 | 4/2016 | Tokimune et al. |
| 2016/0162051 A1 | 6/2016 | Peretz et al. |
| 2016/0179222 A1 | 6/2016 | Chang |
| 2016/0195943 A1 | 7/2016 | Gur et al. |
| 2016/0195944 A1 | 7/2016 | Gur et al. |

OTHER PUBLICATIONS

International Preliminary Report on Patentability dated Mar. 20, 2017 From the International Preliminary Examining Authority Re. Application No. PCT/IB2016/050013. (18 Pages).

International Search Report and the Written Opinion dated Nov. 18, 2016 From the International Searching Authority Re. Application No. PCT/IB2016/050014. (18 Pages).

International Search Report and the Written Opinion dated Jun. 29, 2016 From the International Searching Authority Re. Application No. PCT/IB2016/050013. (17 Pages).

Notice of Allowance dated Mar. 29, 2017 From the Re. U.S. Appl. No. 14/986,764. (11 pages).

Official Action dated Dec. 2, 2016 From the Re. U.S. Appl. No. 14/986,764. (16 pages).

Written Opinion dated Nov. 8, 2016 From the International Preliminary Examining Authority Re. Application No. PCT/IB2016/050013. (8 Pages).

Atmel "Atmel Launches Next Generation MaXStylus mXTS220 Active Pen Active Pen Platform Delivering Extremely Precise Handwriting With an Archtitecture Built for the Future of Stylus. MaZStylus mXTS220 Delivers Significantly Improved Active Pen Performance With Longer Battery Life, Higher Noise Immunity and Optimized Design for Lower System Cost for Mobile Devices", Atmel Corporation, 2 P., Jan. 7, 2015.

Linenberger "The Importance of an Active Digitizer Pen", Blog, p. 1-42, Oct. 16, 2013.

Communication Relating to the Results of the Partial International Search dated Apr. 28, 2016 From the International Searching Authority Re. Application No. PCT/IB2016/050014. (6 Pages).

International Preliminary Report on Patentability dated Aug. 8, 2017 From the International Bureau of WIPO Re. Application No. PCT/IB2016/050014. (13 Pages).

International Search Report and the Written Opinion dated May 17, 2017 From the International Searching Authority Re. Application No. PCT/IB2016/050014. (11 Pages).

Written Opinion dated May 17, 2017 From the International Preliminary Examining Authority Re. Application No. PCT/IB2016/050014. (11 Pages).

* cited by examiner

FIG. 1

| Code 1 | Code 2 | Code 1 | Code 2 | Code 1 | Code 2 | Code 1 | Code 2 | Code 1 | Code 2 | Code 1 | Code 2 |
|---|---|---|---|---|---|---|---|---|---|---|---|
| Slot 1 / Sub-Frame 1 | | Slot 2 / Sub-Frame 2 | | Slot 3 / Sub-Frame 3 | | Slot 1 / Sub-Frame 1 | | Slot 2 / Sub-Frame 2 | | Slot 3 / Sub-Frame 3 | |
| Frame 1 | | | | | | Frame 2 | | | | | |

UNIVERSAL STYLUS COMMUNICATION WITH A DIGITIZER

RELATED APPLICATIONS

This application is a continuation of U.S. patent application Ser. No. 14/986,764, filed on Jan. 4, 2016, which claims the benefit of priority under of U.S. Provisional Patent Application No. 62/099,526 filed on Jan. 4, 2015. The contents of the above applications are all incorporated by reference as if fully set forth herein in their entirety.

FIELD AND BACKGROUND OF THE INVENTION

Signal emitting styluses, e.g. active styluses are known in the art for use with a digitizer system. Position detection of the stylus provides input to a computing device associated with the digitizer system and is interpreted as user commands. Often, the digitizer system is integrated with a display screen, e.g. to form a touch screen. Position of the stylus over the screen is correlated with virtual information portrayed on the screen. The signal emitted by the stylus may include information such as pressure applied on the writing tip and stylus identification. The signal is decoded by the digitizer system to obtain the information.

Digitizer systems typically include a matrix of electrode junctions arranged in rows and columns. Stylus location may be tracked by sampling output in both row and column direction. Tracking is based on detecting a signal emitted by a tip of the stylus and picked up by the digitizer sensor due to electrostatic coupling established between the tip and a portion of the matrix of electrode junctions. Digitizer systems that track signals emitted by the stylus also typically track input provided with a finger or conductive object. A mutual capacitive sensor is one type of digitizer sensor for such digitizer systems. Mutual capacitive detection allows multi-touch operation where multiple fingers, palms or conductive objects are tracked at the same time.

SUMMARY OF THE INVENTION

The disclosure in some embodiments relates to an active stylus that is compatible with plurality of digitizer systems, each configured to receive input with a different communication protocol or configuration. The stylus may be compatible with different versions of a same touch enabled computing device, e.g. from a same manufacturer and may also be compatible with touch enabled computing devices from different manufacturers. Optionally, the stylus provides backwards compatibility so that a user can use a new stylus to operate an older touch enabled computing device. Styluses and touch enabled computing device may typically be sold separately. Styluses tend to get lost and are more prone to breaking. Therefore, a user may purchase a few different styluses prior to buying a new touch enabled computing device. The stylus as described herein may allow a user to provide input to different touch enabled devices without pre-configuring the stylus. In some exemplary embodiments, the compatibilities provided are for specific computing devices or manufacturers based on knowledge of their communication protocols.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

In exemplary embodiments of the present disclosure, a stylus is configured to transmit information in a plurality of different configurations (or communication protocols). Typically, stylus is configured to transmit the same information a plurality of different configurations. Optionally, the accuracy at which the information is provided may be different for different configurations. In addition, the stylus may transmit additional information in one or more of the configurations that is not transmitted in another configuration.

Typically, each configuration is defined based on a known detection and processing method of a touch enabled computing device. In addition, the information provided in each of the different configurations may be based on the information that a touch enabled device is configured to receive. In some exemplary embodiments, one configuration transmits the information based on analog encoding and another configuration transmits the information based on digital encoding. Exemplary information that may be transmitted by the stylus may include identification, pressure, tilt, color, battery level, and authorization. Other handheld devices that transmit information to a touch enabled computing device may also apply the methods described herein.

In some exemplary embodiments, each computing device recognizes and locks into input provided in its compatible configuration. Optionally, a computing device may recognize and detect input provided in more than one configuration. Optionally, detecting input provided in more than one configuration improves the accuracy and SNR at which the information is detected. In some exemplary embodiments, a touch enabled computing device may indicate to stylus, the selected configuration being used. Optionally, in response, the stylus may discontinue transmission in other configurations and only transmit in the configuration recognized by the touch enabled computing device communicating with the stylus.

Figure 1:
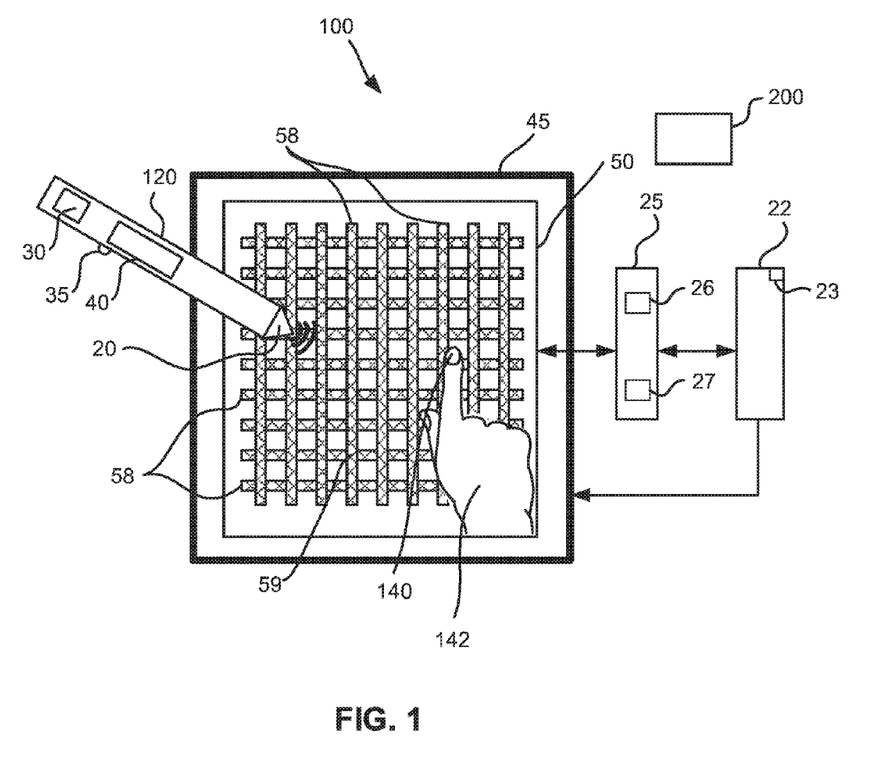
FIG. 1 is a simplified block diagram of an exemplary touch enabled computing device in accordance with some embodiments of the present disclosure.

Reference is now made to FIG. 1 showing a simplified block diagram of an exemplary touch enabled computing device in accordance with some embodiments of the present disclosure. According to some embodiments of the present disclosure, a computing device 100 includes a display 45 that is integrated with a digitizer sensor 50. In some exemplary embodiments, digitizer sensor 50 is a grid based capacitive sensor formed with row and column conductive strips 58 forming grid lines of the grid based sensor.

Typically, conductive strips 58 are electrically insulated from one another and each of conductive strips is connected at least at on one end to digitizer circuitry 25. Typically, conductive strips 58 are arranged to enhance capacitive coupling between row and column conductive strips, e.g. around junctions 59 formed between rows and columns. The capacitive coupling formed between the row and column conductive strips is sensitive to presence of conductive and dielectric objects. Alternatively, digitizer sensor formed with a matrix of electrode junctions that is not necessarily constructed based on row and column conductive strips.

According to some embodiments of the present disclosure, conductive strips 58 are operative to detect touch of one or more fingertips 140 or hand 142 or other conductive objects as well as input by stylus 120 transmitting an electromagnetic signal typically via the writing tip of the stylus. Typically, output from both row and column conductive strips 58, e.g. from two perpendicular axes are sampled to detect coordinates of stylus 120. In some exemplary embodiments, digitizer circuitry 25 typically includes a stylus detection engine 27 for synchronizing with stylus 120, for processing input received by stylus 120 and/or for tracking coordinates of stylus 120.

Input received by stylus 120 may include information directly related to stylus 120, related to an environment around the stylus 120, to a user using stylus 120, to privileges allotted to the stylus 120, capabilities of stylus 120, or information received from a third party device. Information related to the stylus may include indications of a pressed button(s) 35, pressure level on tip 20, tilt, identification, manufacturer, version, media access control (MAC) address, and stored configurations such as color, tip type, brush, and add-ons.

Typically, stylus 120 includes an ASIC 40 that controls generation of a signal emitted by stylus 120. ASIC 40 typically encodes information generated, stored or sensed by stylus 120 on the signal transmitted by stylus 120. Typically, stylus detection engine 27 decodes information received from stylus 120. Optionally, other handheld devices configured to interact with digitizer sensor 50 may be operated in a similar manner and tracked by stylus detection engine 27.

Digitizer circuitry 25 may apply mutual capacitance detection or a self-capacitance for sensing a touch signal from touch (or hover) of fingertip 140. Typically, during mutual capacitance and self-capacitance detection, digitizer circuitry 25 sends a triggering signal, e.g. pulse to one or more conductive strips 58 of digitizer sensor 50 and samples output from conductive strips 58 in response to the triggering and/or interrogation. In some embodiments, some or all of conductive strips 58 along one axis of the grid are triggered simultaneously or in a consecutive manner, and in response to each triggering, outputs from conductive strips 58 on the other axis are sampled. Typically, this procedure provides for detecting coordinates of multiple fingertips 140 touching sensor 50 at the same time (multi-touch). Digitizer circuitry 25 typically includes finger detection engine 26 for managing the triggering signal, for processing the touch signal and for tracking coordinates of one or more fingertips 140.

Typically, output from digitizer circuitry 25 is reported to host 22. Typically, the output provided by digitizer circuitry 25 may include coordinates of one or more fingertips 140, coordinates of writing tip 20 of stylus 120 and additional information provided by stylus 120, e.g. pressure, tilt, and battery level. Typically, digitizer circuitry 25 uses both analog and digital processing to process signals detected with digitizer sensor 50. Optionally, some and/or all of the functionalities of engines 26 and 27 are integrated in one or more processing units adapted for controlling operation of digitizer sensor 50. Optionally, some and/or all of the functionalities of digitizer circuitry 25, engines 26 and 27 are integrated and/or included in host 22. Host 22 may transmit the information to an application manager or a relevant application.

Optionally, circuit 25 and host 22 may transfer the raw information to an application. The raw information may be analyzed or used as needed by the application. At least one of stylus 120, circuit 25 and host 22 may pass on the raw information without analysis or being aware of the information.

According to some exemplary embodiments, stylus 120 additionally includes a wireless communication unit 30, e.g. an auxiliary channel with Bluetooth communication, near field communication (NFC), radio frequency (RF) communication using module 23 of host 22. In some exemplary embodiments, host 22 or circuit 25 instructs stylus 120 to update or configure its transmission protocol based on analysis and reports from circuit 25 and host 22.

Figure 2:
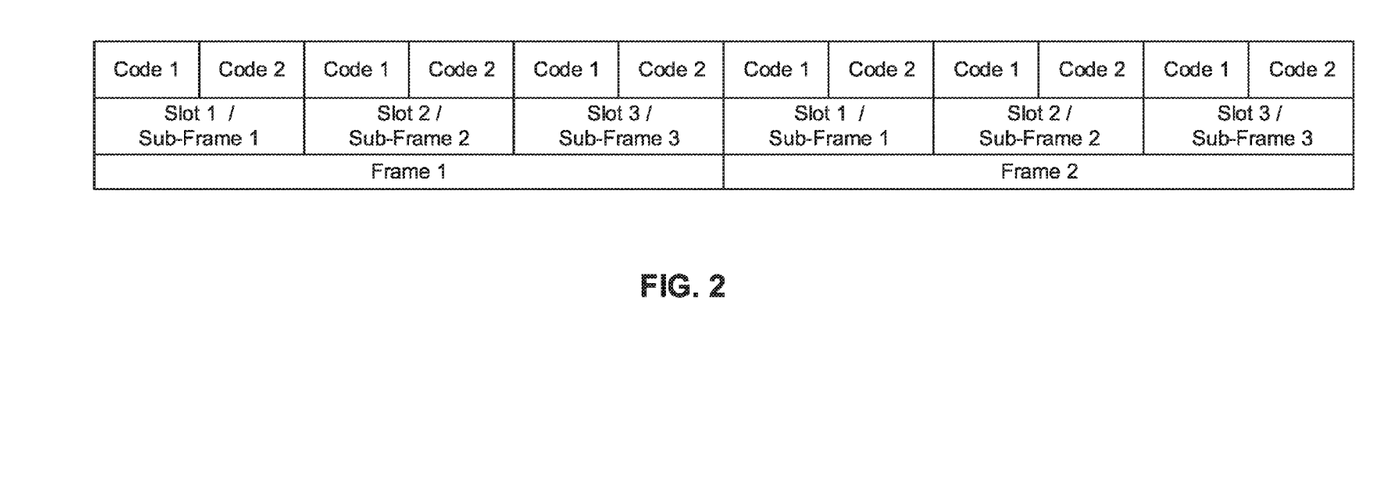
FIG. 2 is a simplified time line of stylus transmission in accordance with some embodiments of the present disclosure.

Reference is now made to FIG. 2 showing an exemplary time line for transmitting information with a stylus in accordance with some exemplary embodiments of the present disclosure. A frame is typically the basic unit in which a stylus transmits information and the frame is typically transmitted at a defined repeat rate, e.g. every 5-20 msec. Each frame may include a synchronization signal (or beacon) and a train of data defining a plurality of parameters, e.g. pressure, hover or tip, button status, identification and error protection scheme. In some exemplary embodiments, the computing device synchronizes with the stylus frame based on detection of the synchronization signal. Typically, the computing device also used the synchronization signal for position detection.

In some exemplary embodiments, a stylus transmits data using two different codes, e.g. Code 1 and Code 2. Typically, Code 1 and Code 2 transmit the same information using different modulation, frequency or both. Optionally, Code 1 uses analog based encoding and Code 2 uses digital based encoding. Analog encoding may include for example using frequency modulation (FM) or a specific frequency for different pressure levels or for identification. Digital encoding may include frequency shift keying (FSK), phase shift keying (PSK), or amplitude shift keying (ASK). Optionally, each frame includes more than one analog code and/or more than one digital code. Typically, Code 1 can be deciphered by one touch enabled computing device and Code 2 can be deciphered by another touch enabled computing device.

Optionally, the data transmitted by the stylus is divided into sub-frames and each sub-frame or slot includes data using both Code 1 and Code 2. For example, two different synchronization signals may be transmitted during Sub-Frame 1, two different pressure signals may be transmitted during Sub-Frame 2 and two different stylus ID signals may be transmitted during Sub-Frame 2. This series may be repeated for each frame. Optionally, more than two types of codes are included in each sub-frame. Optionally, more (or less) sub-frames are included in each frame. The Codes may be transmitted consecutively or simultaneously. For simultaneous transmission, different frequencies may be used for the carrier signal.

In some exemplary embodiments, the stylus transmits at least a portion of the information a piecemeal manner over a plurality of frames. For example, a stylus identity may include a plurality of symbols transmitted over a plurality of frames. Optionally, important information may be repeated. In one exemplary embodiments, the most significant bits of a pressure reading may be repeated over a plurality frames or over a plurality of sub-frames or slots of a signal frame.

Optionally, some of the frames may be universal, e.g. transmitted using one code and other frames may be dedicated, e.g. transmitted using a plurality of codes that provides the same information in different configurations.

Figure 3:
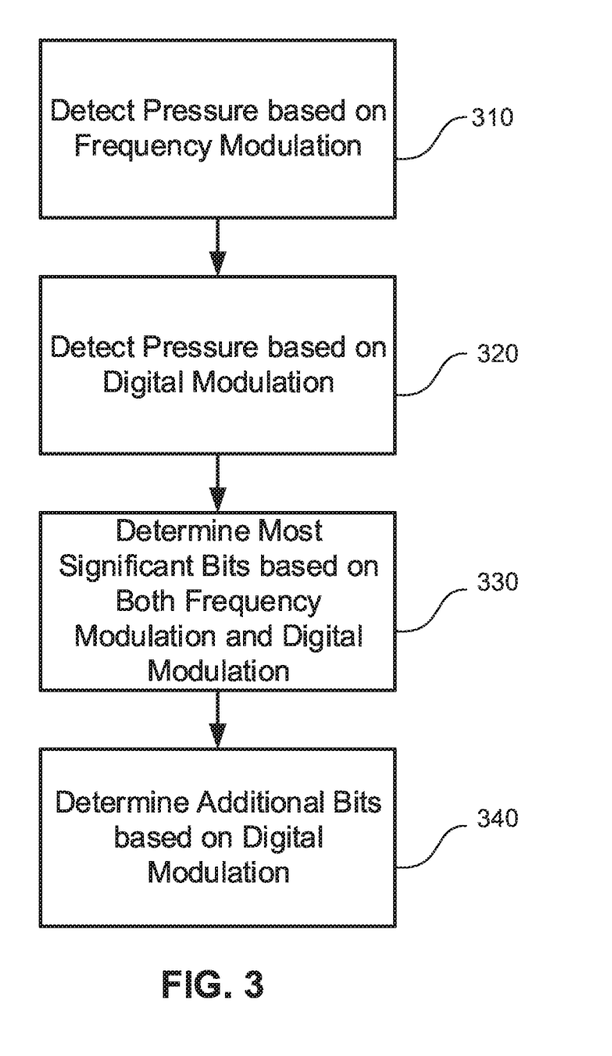
FIG. 3 is a simplified flow chart of an exemplary method for detecting pressure based on transmissions from a stylus in accordance with some exemplary embodiments of the present disclosure.

Reference is now made to FIG. 3 showing a simplified flow chart of an exemplary method for detecting pressure based on transmissions from a stylus in accordance with some exemplary embodiments of the present disclosure. In some exemplary embodiments, a touch enabled computing device may be able to decipher data from two different communication protocols transmitted by the stylus. In one exemplary embodiments, pressure measurements are transmitted by a stylus and using both frequency modulation and digital based modulations. In some exemplary embodiments, a touch enabled computing device detects pressure data transmitted by a stylus based on frequency modulation (block 310) and also based on digital modulation (block 320).

Typically, the pressure information transmitted using frequency modulation has lower resolution than the pressure information transmitted using digital modulation. According to some exemplary embodiments, the most significant bits for the pressure data can be determined from both the frequency modulated signal and the digitally encoded signal (block 330) and the additional bits are determined only based on Digital Modulation (block 340).

Although the digitally encoded signal may typically provide data with higher resolution and accuracy in a no noise environment, noise may introduce large error in each bit of data. An error in reading one of the more significant bits may lead to a larger error in the pressure measurements. On the other hand, frequency modulated signal is typically more robust, e.g. less prone to large errors in detection. An error due to noise may typically result in relatively a small deviation from the actual pressure. By considering both analog and digital modulation, accuracy of the digital information may be verified for at least the most significant bits. The digital data may contain all pressure bits or parts of the bits (LSB—least significant bits), the FM and the digital bits may be with or without overlap. In some exemplary embodiments, when there is a large discrepancy between the analog and digital based pressure reading, the analog reading is used. However, when the discrepancy is small, the digital reading may provide more accurate pressure.

Figure 4:
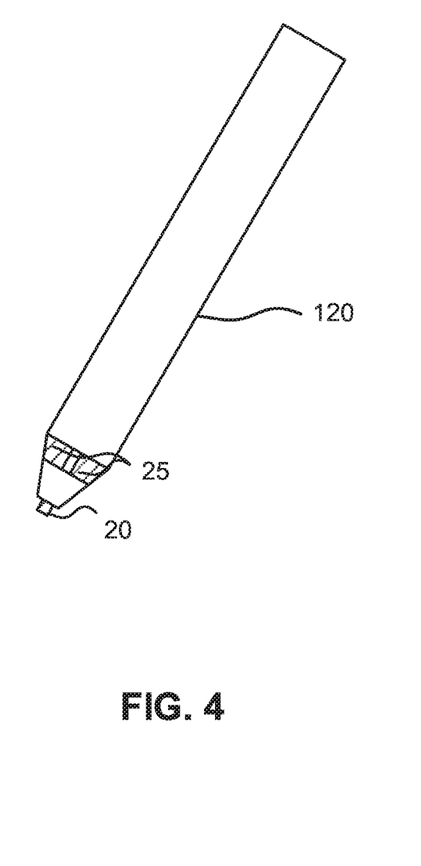
FIG. 4 is a schematic drawing of a stylus including a plurality of electrodes via which information is wirelessly transmitted in accordance with some exemplary embodiments of the present disclosure.

Reference is now made to FIG. 4 showing a schematic drawing of a stylus including a plurality of electrodes configured via which information is wirelessly transmitted in accordance with some exemplary embodiments of the present disclosure. A stylus 120 may including a conductive electrode at tip and may also include one or more electrodes 25 distanced from tip 20. Optionally, electrode 25 is a ring electrode or an array of electrodes 25 forms a ring around housing of stylus 120. Alternatively or additionally, one or more electrodes 25 are embedded in housing of stylus 120. In some exemplary embodiments, data is transmitted via tip 20 and also via electrodes 25. Optionally, tip 20 and electrodes 25 simultaneously transmit signals with information. The information transmitted simultaneously via tip 20 and electrode 25 may be transmitted using different frequencies or modulations so that the signals do not collide. In some exemplary embodiments, tip 20 is configured to transmit signals compatible with one type of touch enabled computing device and one or more of electrodes 25 are configured transmit signals compatible with another type of touch enabled computing device. Each of tip 20 and electrodes 25 may additionally transmit a beacon signal. Optionally a same beacon is transmitted on tip 20 and electrodes 25.

According to some exemplary embodiments, there is provided a method comprising: generating a first signal type and a second signal type in a handheld device, wherein the first signal type and the second signal type are different in at least one of frequency or modulation and wherein the first signal type and the second signal type are defined to include a same information related to the handheld device; and transmitting both the first signal type and the second signal type in a transmission cycle of the handheld device.

Optionally, the first signal type is selected to be compatible with a first detection method of a first touch enabled computing device and the second signal type is selected to be compatible with a second detection method of a second touch enabled computing device.

Optionally, the information is included in the first signal type based on frequency modulation.

Optionally, encoding the information in at least one of the first signal type and the second signal type is based on digital encoding.

Optionally, the digital encoding includes at least one of frequency shift keying (FSK), phase shift keying (PSK), and amplitude shift keying (ASK).

Optionally, the method comprises transmitting a plurality of first signal types and a plurality of second signal types in the transmission cycle, wherein each first type and second signal type of the plurality includes different information.

Optionally, the information is selected from a group including: indication of pressed buttons, pressure level on tip, hover or tip status, tilt and identification.

Optionally, the first signal and the second signal type are transmitted simultaneously.

Optionally, the first signal type includes the information with less resolution than the second signal type.

Optionally, the second signal type includes more information than the first signal type.

Optionally, the first signal type and the second signal type also include different information.

Optionally, both the first signal type and the second signal type is transmitted via a tip of the handheld device.

Optionally, the first signal type is transmitted via a first electrode of the handheld device and the second signal type is transmitted via a second electrode of the handheld device.

Optionally, one of the first or second electrodes is a tip of the handheld device.

According to some exemplary embodiments, there is provided a method comprising: detecting a first signal and a second signal from a handheld device with a touch enabled computing device, wherein the first signal and the second signal include a same information related to the handheld device and wherein the first signal includes the information based on frequency modulation and the second signal includes the information based on digital encoding and wherein the information in the second signal is provided with higher resolution as compared to the information in the first signal; decoding the information in both the first signal and the second signal; verifying a most significant bit in the second signal based on the first signal; and reporting the information as verified to a host of the touch enabled computing device.

Optionally, the information is output from a sensor embedded in the handheld device.

Optionally, the information is pressure applied on a tip of the handheld device, wherein the tip is configured to interact with the touch enabled device by touch.

Optionally, the first signal and the second signal are transmitted over a same transmission cycle of the handheld device.

Optionally, the second signal is transmitted over a plurality of transmission cycles of the handheld device.

According to some exemplary embodiments there is provided a device comprising: an electrode; a circuit in communication with the electrode; the circuit comprising a signal generator; wherein the signal generator is configured to generate a first signal type and a second signal type, wherein the first signal type and the second signal type are different in at least one of frequency or modulation and wherein the first signal type and the second signal type are defined to include a same information related to the handheld device; and wherein the circuit is configured to transmit both the first signal type and the second signal type in a same transmission cycle of the handheld device.

Optionally, the information is included in the first signal type based on frequency modulation.

Optionally, encoding the information in at least one of the first signal type and the second signal type is based on digital encoding.

According to some exemplary embodiments there is provided a device comprising: a first electrode at a tip of the device; a second electrode; a circuit comprising a signal generator; wherein the signal generator is configured to generate a first signal and a second signal, wherein the first signal and the second signal are different in at least one of frequency or modulation; and wherein the circuit is configured to transmit the first signal via the first electrode and the second signal via the second electrode.

Optionally, the circuit is configured to transmit the first signal and the second signal simultaneously.

Optionally, the first signal and the second signal include different information.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising:
    generating a first signal type and a second signal type in a handheld device, wherein the first signal type is selected to be compatible with a first detection method of a first touch enabled computing device and the second signal type is selected to be compatible with a second detection method of a second touch enabled computing device and wherein the first signal type and the second signal type are different in at least one of frequency or modulation and wherein the first signal type and the second signal type include information related to a same parameter, the parameter related to the handheld device; and
    transmitting both the first signal type and the second signal type over the same transmission cycle of the handheld device.

2. The method of claim 1, wherein the parameter is selected from a group including: indication of pressed buttons, pressure level on tip, hover or tip status, tilt and identification.

3. The method of claim 1, wherein the information is encoded in the first signal type based on frequency modulation.

4. The method of claim 1, wherein the information is encoded in at least one of the first signal type and the second signal type based on digital encoding.

5. The method of claim 4, wherein the digital encoding includes at least one of frequency shift keying (FSK), phase shift keying (PSK), and amplitude shift keying (ASK).

6. The method of claim 1, comprising transmitting a plurality of first signal types and a plurality of second signal types in the transmission cycle, wherein each first type and second signal type of the plurality includes information related to a different parameter.

7. The method of claim 1, wherein the first signal and the second signal type are transmitted simultaneously.

8. The method of claim 1, wherein the first signal type includes the information with less resolution than the second signal type.

9. The method of claim 1, wherein the second signal type includes more information than the first signal type.

10. The method of claim 1, wherein the first signal type and the second signal type also include information related to different parameters.

11. The method of claim 1, wherein both the first signal type and the second signal type is transmitted via a tip of the handheld device.

12. The method of claim 1, wherein the first signal type is transmitted via a first electrode of the handheld device and the second signal type is transmitted via a second electrode of the handheld device.

13. The method of claim 12, wherein one of the first or second electrodes is a tip of the handheld device.

14. A method comprising:
    detecting a first signal and a second signal from a handheld device with a touch enabled computing device, wherein the first signal and the second signal include information related to a same parameter, the parameter related to the handheld device and wherein the first signal includes the information based on frequency modulation and the second signal includes the information based on digital encoding and wherein the information in the second signal is provided with higher resolution as compared to the information in the first signal;
    decoding the information in both the first signal and the second signal;
    verifying a most significant bit in the second signal based on the first signal; and
    reporting the information as verified to a host of the touch enabled computing device.

15. The method of claim 14, wherein the parameter is pressure applied on a tip of the handheld device, wherein the tip is configured to interact with the touch enabled device by touch.

16. The method of claim 14, wherein the first signal and the second signal are transmitted over the same transmission cycle of the handheld device.

17. The method of claim 14, wherein the information transmitted by at least one of the first signal and the second signal is transmitted over a plurality of transmission cycles of the handheld device.

18. A device comprising:
an electrode;
a circuit in communication with the electrode, the circuit comprising a signal generator;
wherein the signal generator is configured to generate a first signal type and a second signal type, wherein the first signal type is selected to be compatible with a first detection method of a first touch enabled computing device and the second signal type is selected to be compatible with a second detection method of a second touch enabled computing device and wherein the first signal type and the second signal type are different in at least one of frequency or modulation and wherein the first signal type and the second signal type are defined to include information related to a same parameter; and
wherein the circuit is configured to transmit both the first signal type and the second signal type in the same transmission cycle of the device.

19. The device of claim 18, wherein the information is encoded in the first signal type based on frequency modulation and in the second signal type based on digital encoding.

20. The device of claim 18, wherein the parameter is selected from a group including: indication of pressed buttons, pressure level on tip, hover or tip status, tilt and identification.

* * * * *